(12) United States Patent
Bankert

(10) Patent No.: US 7,806,457 B2
(45) Date of Patent: Oct. 5, 2010

(54) CARGO COVER LIFT AND PIVOT SYSTEM

(76) Inventor: Bryan Bankert, 5842 N. East Shore Dr., Morgantown, IN (US) 46160

( * ) Notice: Subject to any disclaimer, the term of this patent is extended or adjusted under 35 U.S.C. 154(b) by 0 days.

(21) Appl. No.: 12/369,741

(22) Filed: Feb. 12, 2009

(65) Prior Publication Data

US 2009/0256381 A1 Oct. 15, 2009

Related U.S. Application Data

(60) Provisional application No. 61/124,038, filed on Apr. 11, 2008.

(51) Int. Cl.
*B60J 7/08* (2006.01)
(52) U.S. Cl. .............................. 296/100.05; 296/100.1
(58) Field of Classification Search ............ 296/100.02, 296/100.03, 100.05, 100.06, 100.08, 100.1
See application file for complete search history.

(56) References Cited

U.S. PATENT DOCUMENTS 6,520,558 B1 * 2/2003 Katterloher et al. .... 296/100.06

* cited by examiner

*Primary Examiner*—Joseph D Pape
(74) *Attorney, Agent, or Firm*—Anthony A. Davis; Bowman & Davis, P.A.

(57) ABSTRACT

A lift and pivot hinge mechanism that can be installed upon a conventional pick up truck bed in conjunction with a conventional box type cargo topper. The lift and pivot mechanism opens the topper in a clamshell manner whereby the rear of the topper is elevated in relation to the truck bed, thereby providing greater access to the cargo area. The opening process is accomplished in two stages. The topper is first slightly lifted diagonally, further defined as horizontally relative to the truck bed and rearward in relation to the passenger cab. By performing this first step the necessary clearance is provided to perform the second step, which is pivoting the rear of the topper upward in relation to the truck bed thereby providing greater access to the truck's cargo area. Alignment guides are utilized to assure consistent placement of the topper in relation to the truck bed. The hinge mechanism may be utilized with conventional (non-purpose built) truck toppers, does not occupy precious cargo area within the truck bed and can be fitted to all presently known pick up truck beds. One or more linear power assist mechanisms are utilized to assist in the opening and closing process.

10 Claims, 8 Drawing Sheets

CARGO COVER LIFT AND PIVOT SYSTEM

RELATED APPLICATIONS

This application claims the benefit of and/or priority to U.S. Provisional Patent Application Ser. No. 61/124,038 filed Apr. 11, 2008 titled "Cargo Cover Lift and Pivot System", the entire contents of which is specifically incorporated herein by this reference.

FIELD OF THE INVENTION

The present invention relates to a lift and pivot system which facilitates the lifting/opening of a cargo cover affixed upon a vehicle in a manner where such opening and closing does not interfere with the physical structure of the vehicle upon which the cargo cover is mounted.

BACKGROUND OF THE INVENTION

Owners of vehicles with a cargo area (such as pickup truck) often purchase a cargo cover in order to protect and secure the cargo situated within the cargo area. There are of course many types of cargo covers available to pick-up truck owners, such as flat cargo covers and box type cargo covers. A flat cargo cover is relatively flat in shape and when in the closed position lies substantially planar upon the side rails of the pick-up truck cargo areas and provides coverage to the entire cargo area. Due to its flat shape, it is relatively easy to attach the flat cargo cover to the cargo area by providing a standard hinge positioned at the front (the portion near the passenger cab) of the cargo area. A flat cargo cover typically does not increase the secured cargo area of a pick-up truck when in the closed position. Thus, there are often times when a flat cargo cover does not provide enough secured area to carry the desired volume of cargo. In comparison, while in the opened position a flat cargo cover does provide greater access to the cargo area and also allows the user to carry more cargo in an unsecured manner by allowing cargo to exceed the height of the cargo area side walls.

For at least the above reasons, many times a pick-up truck owner will not select a flat cargo cover and will instead employ a box type cover since it provides additional secured cargo space. One drawback to a box type cargo cover is that it is impossible to open and close in the same manner as a flat cargo cover (with a simple hinge as described above) due to the height of the rear wall of the pick-up passenger cab and the height of the front wall of the box cargo cover. Utilizing a simple hinge at the lower front base of the box type cargo cover would cause the rear wall of the pick-up passenger cab and the front wall of the cargo cover to contact each other when attempting to open the cargo cover. This contact would prohibit any upward pivoting motion of the box cargo cover in relation to the cargo area. Therefore, users of typical box cargo covers have been limited to the height of the cargo they can carry within the cargo area. Instead of tilting the box cargo cover, users were relegated to accessing the cargo area through a door located at the rear of the box cargo cover.

To that end, numerous systems are known which provide various mechanisms for lifting various types of box cargo covers.

One such known device is that set forth in U.S. Pat. No. 5,102,185 to Lake, issued Apr. 7, 1992. The Lake device teaches a lifting cargo cover which utilizes an inner structure mounted within the cargo area to act as support for the tilt mechanism of the cargo cover. This design is comprised of a separate front wall portion which is hinged at its top to the remaining portions of the cargo cover. This separated design creates the potential for leaks into the cargo area as well as increased wind noise while in transit. This design requires an inner standalone structure which occupies valuable cargo area floor space. In order to utilize this design a purpose built box cargo cover would need to be constructed. In other words, this design could not be easily retrofitted to a standard box cargo cover.

Another known device is that set forth in U.S. Pat. No. 5,104,275 to Enninga, issued Apr. 14, 1992. This device solves one of the perceived shortcomings of the Lake device which necessitated that the box cargo cover be built in separate pieces. By moving the lift/support structure rearward in relation to the truck cab, the Enninga device relocated the swivel/lift point to an area further away from the truck cab thereby allowing the box cargo cover to lift and pivot in relation to the cargo area of the pick-up. This improvement allowed the box cargo cover to be built as a unitary structure, meaning that the front and sides of the cover are all fixedly attached. Although this was an improvement over the Lake device, the Enninga device, similar to the Lake device, still required a separate structure to be placed at least partially upon the cargo area floor, there taking up cargo space otherwise available for hauling cargo. Like the Lake device, in order to utilize this design a purpose built box cargo cover would need to be constructed. In other words, this design could not be easily retrofitted to a standard box cargo cover.

Yet another device set forth in U.S. Pat. No. 5,595,418 to Medlin, issued Jan. 21, 1997, teaches a lift mechanism which improves upon both Lake and Enninga in that the Medlin device does not require a standalone support unit upon the floor of the cargo space area. This device utilizes the front wall (closest in proximity to the pick-up truck cab) for supporting and mounting the lift mechanism. Although this design does solve the perceived shortcomings of both Lake and Enninga, use of the Medlin device still requires the construction of a purpose built box cargo cover in order to support the lift mechanism. Similar to the Lake and Enninga devices, this design also could not be easily retrofitted to a standard box cargo cover.

Later came the device set forth in U.S. Pat. No. 6,543,834 to Sisson, issued Apr. 8, 2003. Although the working of the actual lift mechanism of the Sisson device is somewhat different than that set forth in the Lake device, the structure and basic function of the Sisson device incorporates the same shortcomings as set forth above for the Lake device.

The last relevant device is set forth in U.S. Pat. No. 7,275,779 to Hebron, issued Oct. 2, 2007. In order to remove the inner support structure from the cargo floor area as required by the Lake, Sisson, and Enninga devices, this device relocated the lift mechanism to the wheel well area. This device lifts the box cargo cover from the side in a manner which tilts the box topper on its side when opened. This device utilizes a single lifting mechanism mounted upon the wheel well of the cargo area. Although this device does provide a bit more usable cargo area that the previously mentioned devices, this device does occupy some cargo space and was not designed for transporting cargo with the box cargo cover in the opened or partially opened position. When opened, this cargo box cover hangs off of the side of the vehicle and perhaps into traffic or roadside objects. Is also doubtful that this device would be structurally sound enough to travel in the opened position.

Therefore, it would be desirable in the art to construct a box cargo cover lift mechanism which: a) does not require a purpose built cargo cover thereby reducing the cost of implementing such a lift device, b) is constructed in a manner that can be retrofitted to a standard pre-existing box cargo cover, c) is constructed in a manner that does not require a separate support member mounted in the floor or wheel well spaces of the cargo area, d) is designed to safely allow the transportation of cargo while the box cargo cover is in the opened position, and e) is designed and constructed in a manner which makes it universally adaptable to existing pick up truck cargo areas.

Accordingly, the present invention overcomes the aforementioned shortcomings of the known prior art and provides improvements as stated above. The present invention is summarized and described in detail below.

SUMMARY OF THE INVENTION

The present invention is a mechanical lift system which is typically affixed to a vehicle with a cargo compartment, such as a pick-up truck. The present invention is more particularly defined as a lifting mechanism for a box type cargo cover which is commonly utilized on pickup trucks having a passenger cab and a cargo area. The present lift system is comprised of an arrangement of brackets which work in a cooperative manner to open and close the box cargo cover in a clamshell fashion. Opening of the cargo cover occurs in two stages. First, the cargo cover is simultaneously lifted and slid (in a horizontal fashion) upward from the cargo area and rearward in relationship to the passenger cab. After the cargo cover is lifted and slid a predetermined distance, the cargo cover is ready to be pivoted (in relation to the passenger cab) whereby the rear of the cargo cover is lifted upward in relationship to the cargo area. Closing the cargo cover occurs in the reverse order. First, the rear of the cargo cover is pivoted downward to a position that is substantially horizontal to the cargo area. The entire cargo cover is then simultaneously slid downward and forward towards the passenger cab until the cargo cover rests upon the side rails of the cargo area. The lifting mechanism also incorporates a power assist mechanism which assists the user in raising the cargo cover, and also maintains the cargo cover in the opened position until the user closes the cargo cover. In the preferred embodiment of the invention, the power assist mechanism is defined as a pair of electrically motivated linear rams. The rams are wired to the vehicles 12 volt electrical system and selectively operated by a three position switch. Of course any type or number of switches may be used to selectively energize the linear actuators to raise and lower the cargo cover. The present invention can be mounted to most existing box type cargo covers and does not require a purpose built cargo cover. The present invention is also constructed in a manner which allows it to be mounted upon all known pick-up truck beds. The present invention also does not occupy floor or wheel well space within the cargo area, thereby providing more room to haul cargo.

In the preferred embodiment, the mechanical lift system is comprised of a pair of lift mechanisms, one for each side of the cargo area. Each lift mechanism is further defined as a front combination slide/lift/pivot assembly ("front assembly"), and a rear slide/lift assembly ("rear assembly"). The front assembly is further defined as having a front upper portion and a front lower portion. Upon one portion of the front assembly, a front pivot pin is mounted, and on the other portion of the front assembly, a front slot is positioned thereupon which is defined as having closed ends. Assuming that the front slot is located upon the upper front portion, the angle of the front slot extends downward in relation to the cargo area, and forward toward the passenger cab. The front assembly also contains a power assist mechanism which assists the user in opening and closing the cargo cover. One end of the linear ram is attached to the cargo cover, and the other end of the linear ram is mounted upon the lower front portion. The power assist mechanism is further defined as a linear ram that is actuated by an electrical motor. The electrical motor is wired to a three position selectable switch which receives its power from the host vehicle's power supply. In another preferred embodiment, pressurized gas-filled nitrogen linear rams are utilized in place of or in conjunction with the electrically powered linear rams.

The rear assembly is further defined as having a rear upper portion and a rear lower portion. Upon one portion of the rear assembly, a rear pin is mounted. On the other portion of the rear assembly, an angled slot is positioned thereupon which has one closed end and one open end. Assuming that the rear slot is located upon the lower rear portion, the angle of the rear slot extends upward at substantially the same angular direction as the front slot. Once again, assuming that the rear slot is located upon the rear lower portion, the rear slot engages the rear pin which is located upon the upper rear portion. The open end of the rear slot is defined as the top portion of the rear slot (in relation to the portion of the rear slot located nearest to the cargo area). While the cargo cover is in the closed position, the front pivot pin is located at the top end of the front slot, and the rear pin is located at the bottom end of the rear slot.

To open the cargo cover, the user activates the power assist mechanism by either activating the electrical switch thereby causing the electrical rams to expand when present, or by physically initiating the expanding motion of the gas-filled linear rams when present.

Assuming that the front slot is located upon the upper front portion, and the rear slot is located upon the lower rear portion, upon initiation of the lifting process, the front slot immediately starts to travel upward and rearward over the front pin while at the same time the rear pin immediately starts to travel up the rear slot. The effect of both pins traveling within or in relation to each respective slot causes the cargo cover to lift simultaneously, in substantially a horizontal manner, upward from the cargo area and rearward from the passenger cab.

Upon the bottom of the front slot reaching the front pin the rear pin has simultaneously reached the top open end of the rear slot thereby causing the rear pin to become disengaged from the rear slot, thereby releasing the cargo cover from the cargo area. This initial lift of the cargo cover also provides the necessary clearance needed between the cargo cover and the rear wall of the passenger cab, which is needed in order to pivot the rear of the cargo cover upward in relation to the cargo area. The disengagement of the rear pin from the rear slot allows further expansion of the power assist mechanism which rotates the cargo cover at the front pin location (at the bottom end of the front slot) to swing the rear of cargo cover upward in a clamshell manner.

Of course it can be appreciated that the front slot and the front pin can be located upon either the upper or lower portion of the front assembly. It must also be appreciate that the rear slot and the rear pin may be located upon the upper or lower rear assembly.

In summary, my invention provides a combination of the following advantages relative to box type cargo covers and the trucks they are mounted on known within the prior art:

a) my invention does not require a purpose built cargo cover thereby reducing the cost of implementing such a lift device upon existing known pick up truck beds;

b) is constructed in a manner that can be retrofitted to a standard pre-existing box cargo cover;

c) is constructed in a manner that can be retrofitted to any known box type cargo compartment;

d) is constructed in a manner that does not require a separate support member be mounted in the floor or wheel well spaces of the cargo area; and e) is designed to safely allow the transportation of the cargo while the box cargo cover is in the opened or partially opened position.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The above mentioned and other features, advantages and objects of this invention, and the manner of attaining them, will become apparent and the invention itself will be better understood by reference to the following description of embodiments of the invention taken in conjunction with the accompanying drawings, wherein.

Figure 1:
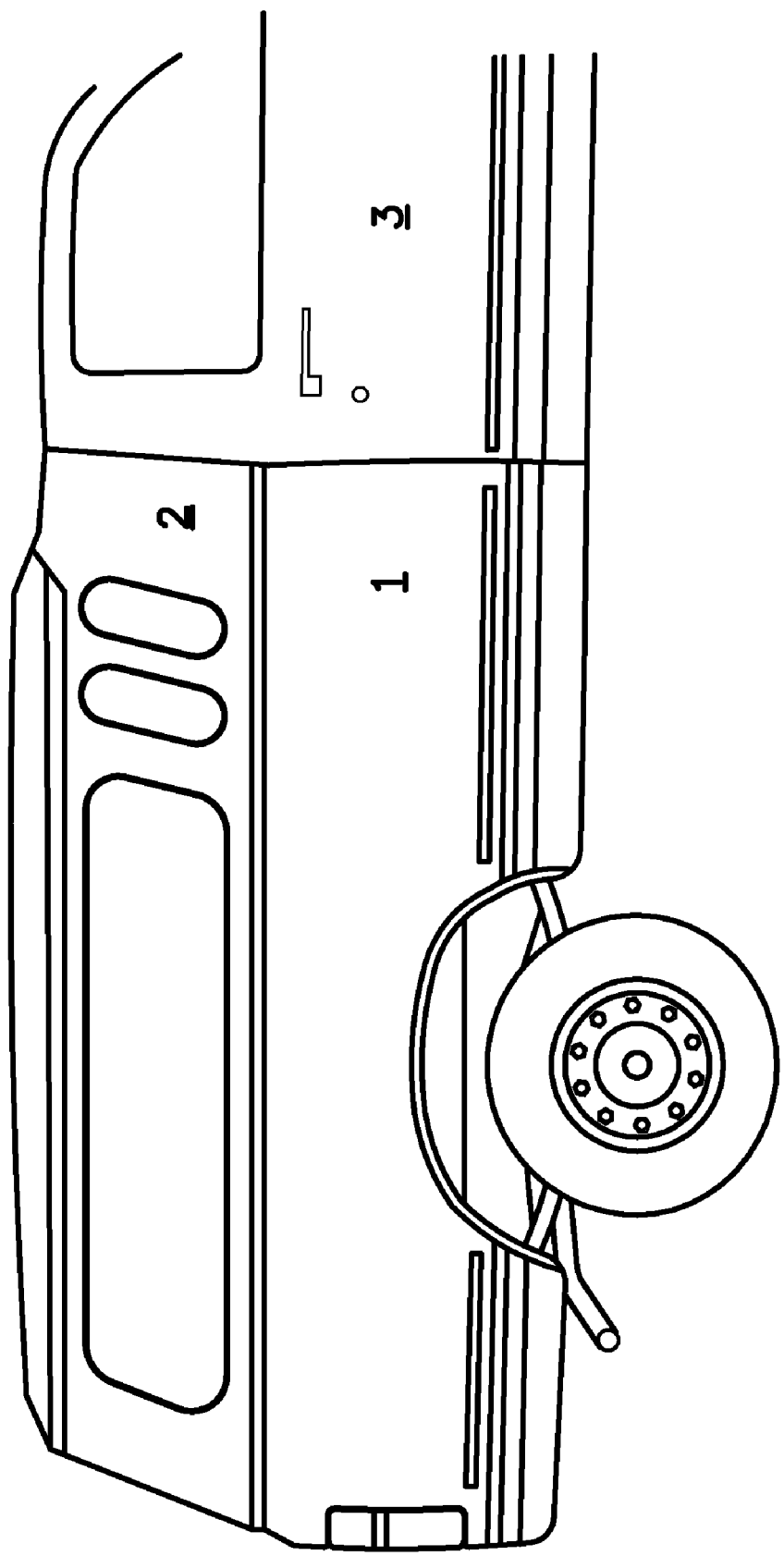
FIG. 1 is an exterior side view of a pickup truck bed with a cover (sometimes called a camper shell) and the back of the cab of the pickup truck.

Like reference numerals indicate the same or similar parts throughout the several figures. A discussion of the features, functions and/or configuration of the components depicted in the various figures will now be presented. It should be appreciated that not all of the features of the components of the figures are necessarily described. Some of these non discussed features as well as discussed features are inherent from the figures. Other non discussed features may be inherent in component geometry and/or configuration.

DETAILED DESCRIPTION OF AN EMBODIMENT OF THE INVENTION

Figure 5:
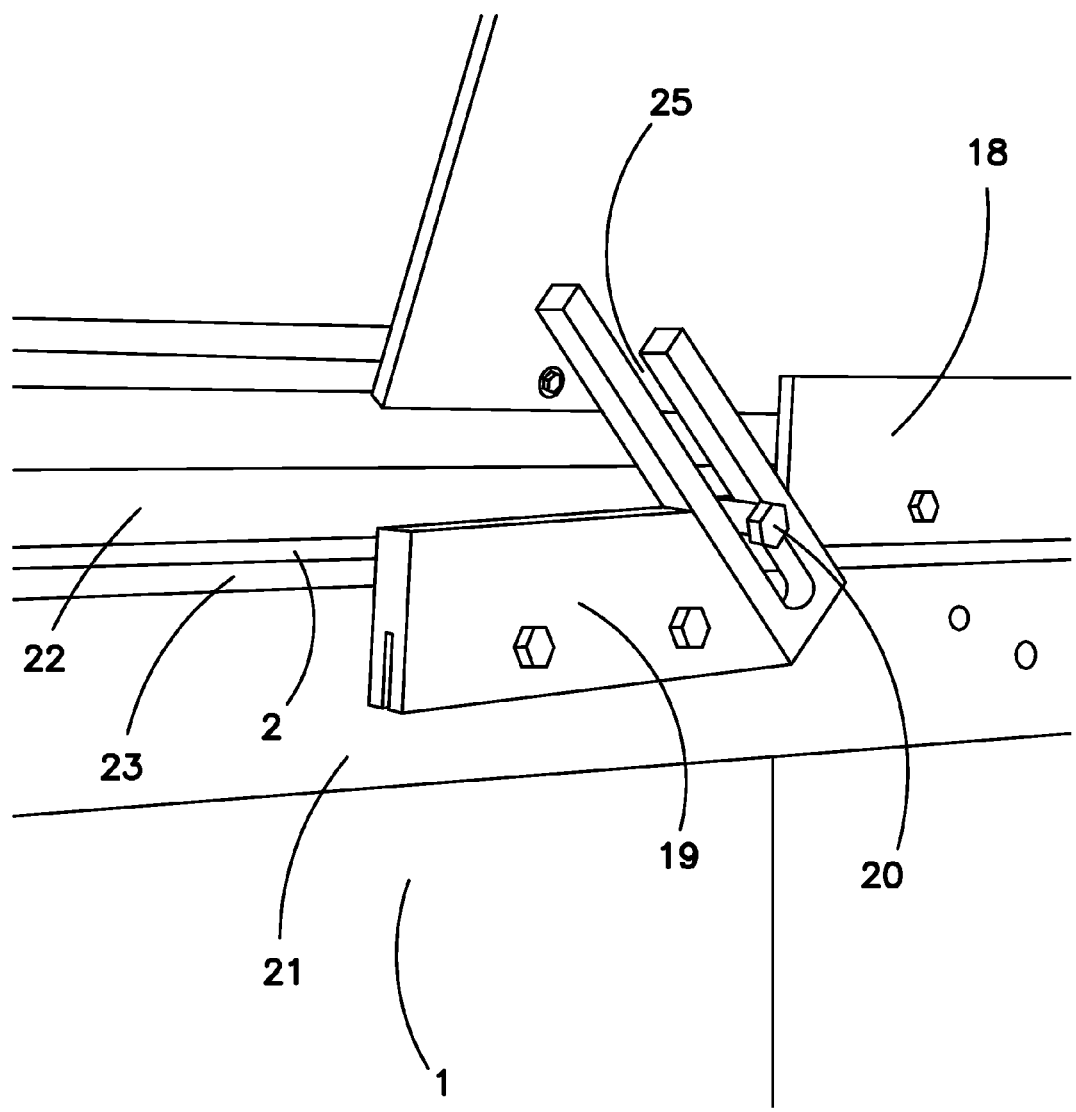
FIG. 5 is a side view from inside the pickup truck bed showing the rear components of the lift and pivot system.
Figure 6:
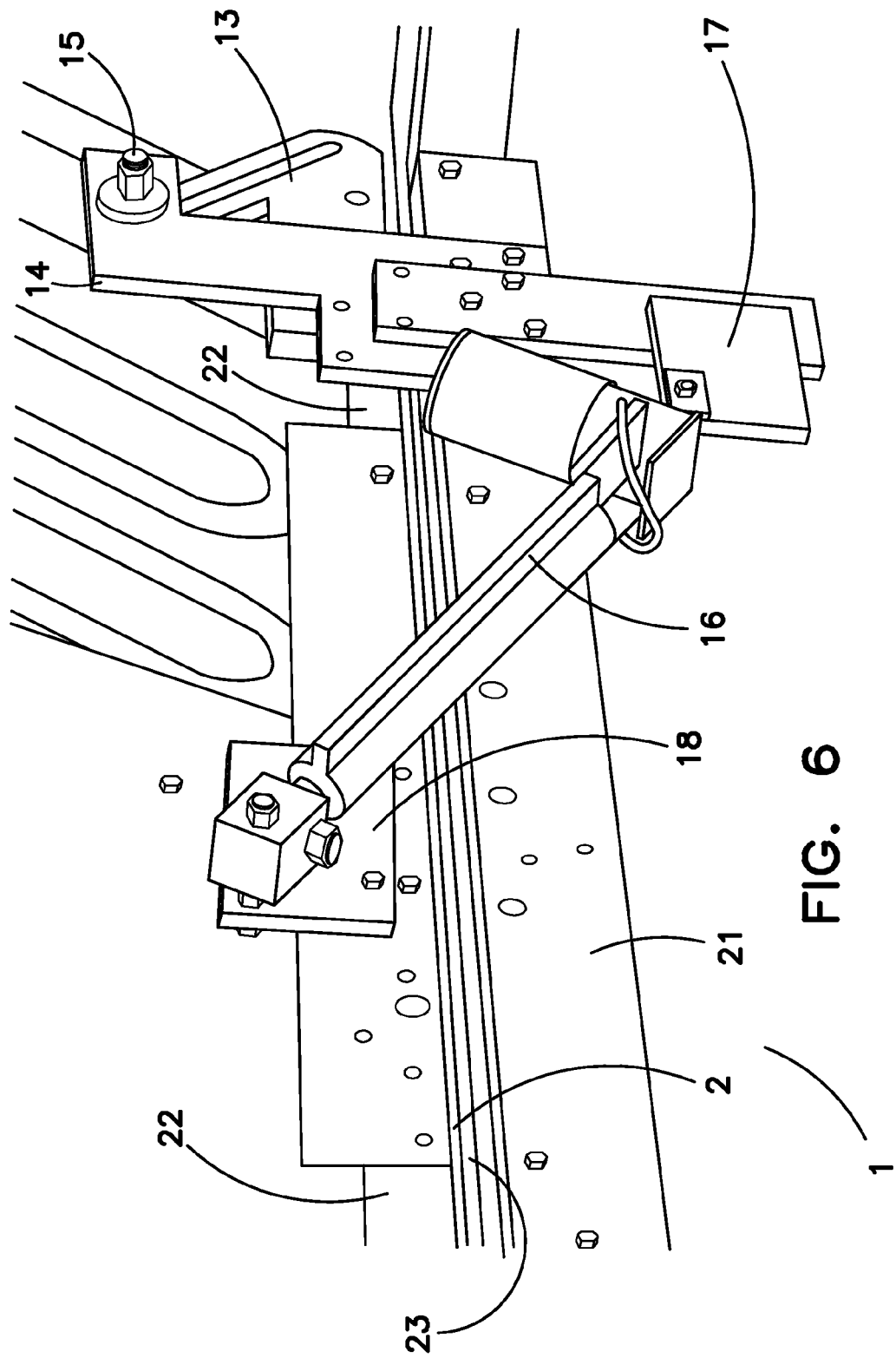
FIG. 6 is a side view from inside the pickup truck bed showing the front components of the lift and pivot system.
Figure 7:
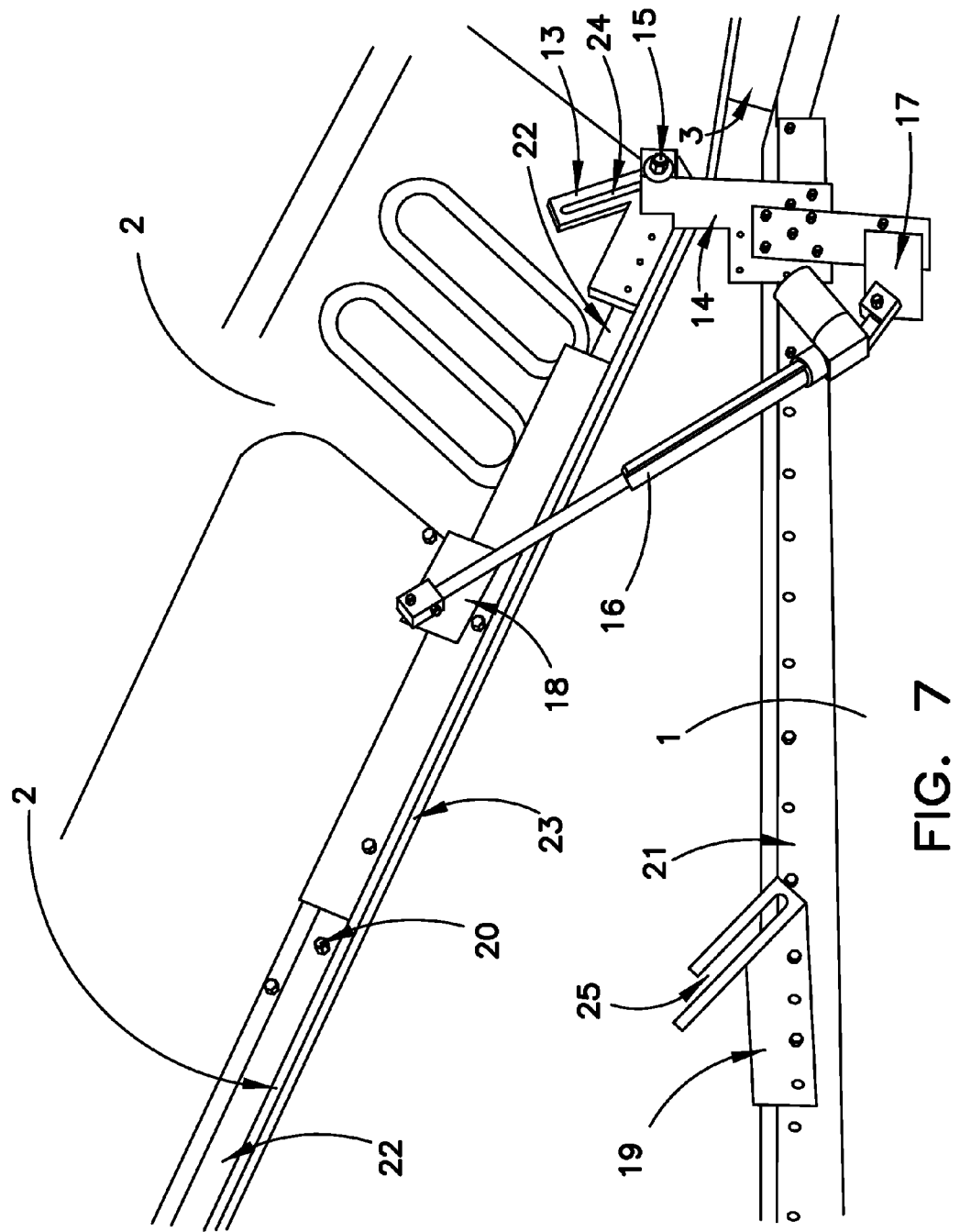
FIG. 7 is a side view from inside the pickup truck bed showing both the rear and forward components of the lift and pivot system.

Referring to FIGS. 5, 6 and 7, a lower support plate 21 is mounted to the side rail of a cargo area of a pickup truck bed 1 in an orientation that is vertical to the flooring surface of the pickup truck bed 1. The lower support plate 21 can be secured to the pickup truck bed 1 in any fashion (for example, bolts, screws, clamps, or welded) which provides rigid support for the lifting mechanism. The lower support plate 21 carries a front pivot arm 14, a lower extending arm bracket 17, and a rear slotted bracket 19. The forces exerted upon a pickup truck bed 1 caused by the leveraged lifting of a cover 2 are concentrated in an area near the attachment point of the lower extending arm bracket 17. These forces are distributed over a length of the sides of the pickup truck bed 1 by the lower extending arm bracket 17 being attached to the lower support plate 21.

Figure 9:
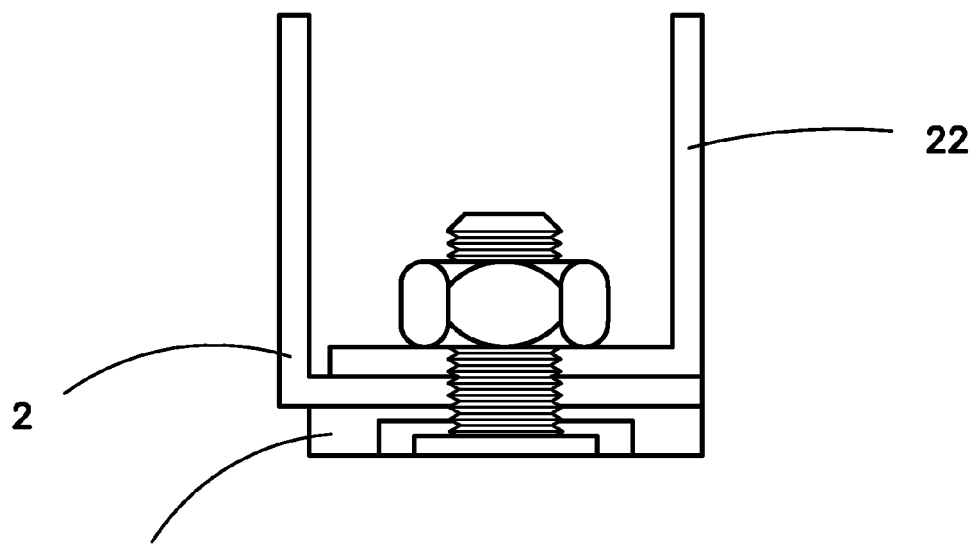
FIG. 9 is a cross sectional view of the upper lift mechanism as attached to a cargo cover.

Once again referring to FIGS. 5, 6, 7 and 9, an upper support plate 23 is mounted under the horizontal surface running a length of both sides of the cover 2 (which surface would ordinarily make contact with the top horizontal "bed rail" portion of the pickup truck bed 1 when the cover is secured to the pickup truck bed 1 absent the present invention) with multiple countersunk (flush head) bolts (see FIG. 9) installed upward thru the upper support plate 23, thru the horizontal surface of the cover 2 running a length of both sides of the cover 2, and thru an "L-shaped" upper support angle 22. The surface of the upper support angle 22 which is vertical to the upper support plate 23 carries a rear pin 20, an upper extending arm bracket 18, and a front slotted bracket 13. In the alternative, the upper support angle 22 can be rigidly mounted to the upper support plate 23 in any fashion which provides rigid support for the lifting mechanism. Referring to FIG. 7, the forces on a cover 2 caused by the leveraged lifting of the cover 2 are distributed over a length of the cover 2 through the upper support angle 22.

The upper support angle 22 and the lower support plate 21 are connected to each other by a front pivot pin 15 which is inserted through the front slotted bracket 13 and an aperture located within the front pivot arm 14.

The upper support angle 22 and the lower support plate 21 are further connected by a linear actuator 16. One end of the linear actuator 16 is pivotally connected to the upper extending arm bracket 18, and the other end of the linear actuator 16 is pivotally connected to the lower extending arm bracket 17. In the preferred embodiment herein discussed, the linear actuator 16 is energized by a switchable 12 volt power supply. Upon energizing the linear actuator 16, the process of opening or closing the cover 2 will commence. Although an extending arm which provides power in both directions when energized is preferred, it is noted that a hydraulic cylinder, pressurized gas filled spring, or other lifting means may also be employed in conjunction with or in place of the electric linear actuator 16.

Figure 4:
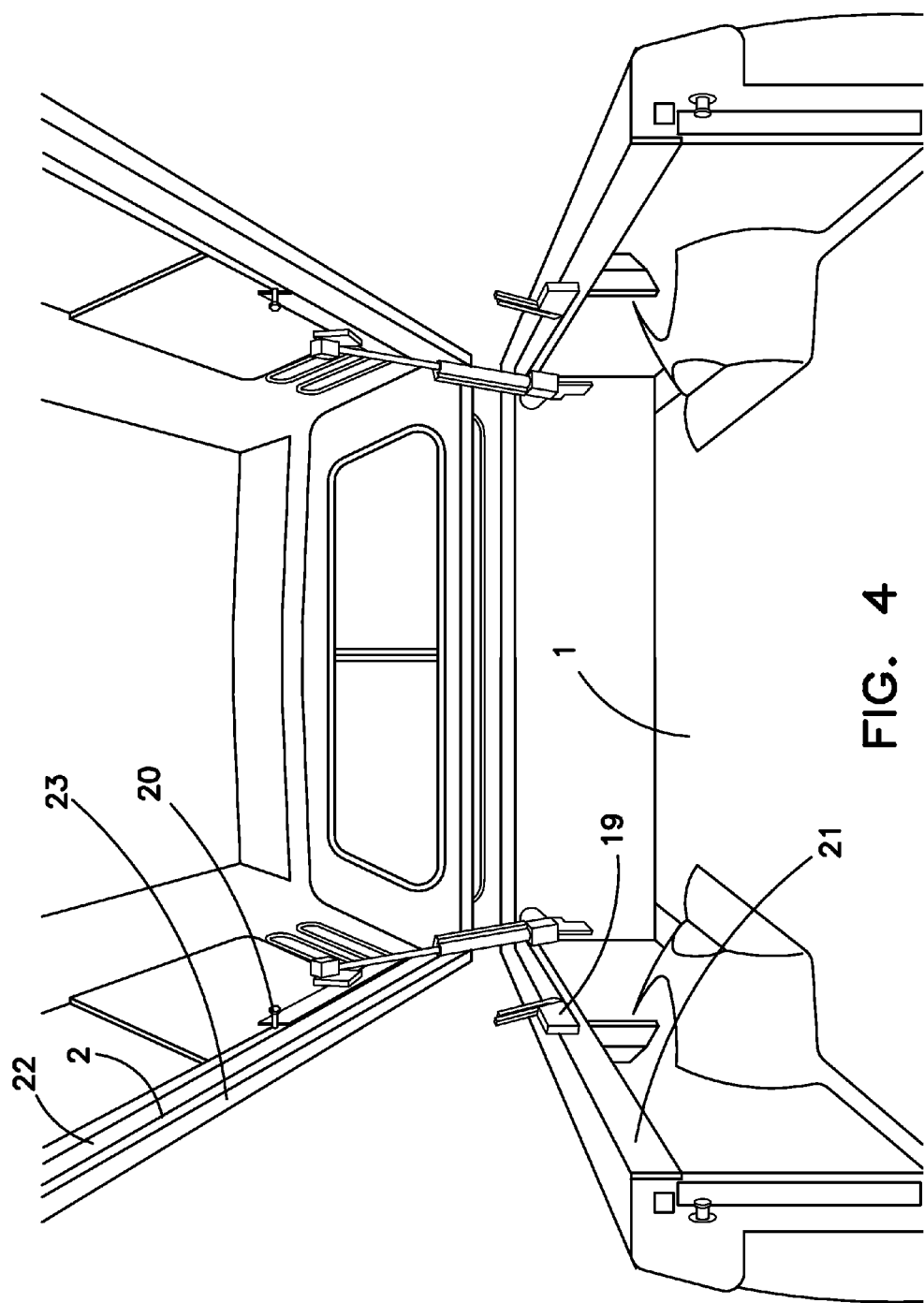
FIG. 4 is a rear view of the interior of a pickup truck bed where the cover is fully lifted.

Please also note that in a typical installation, the components shown in FIGS. 5, 6, and 7 are also installed on the passenger side of the pickup truck bed 1 to form a pair of lifting devices (see FIG. 4). The pair of lifting devices work in unison to provide the desired open or closing of the cover 2. Referring to FIG. 1, a traditional cover 2 is affixed to a pickup truck bed 1 in the closed position.

Figure 2:
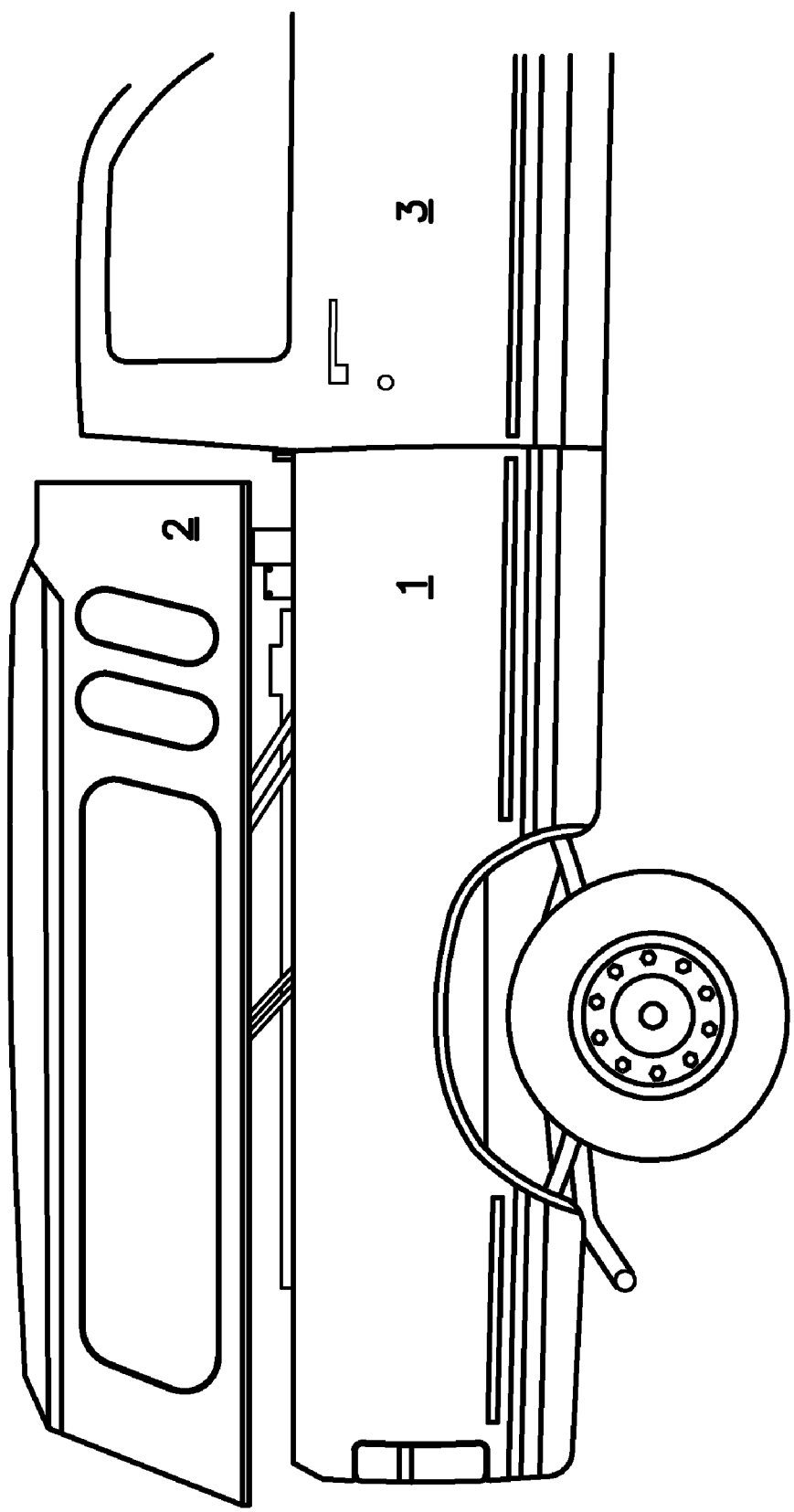
FIG. 2 is an exterior side view of a pickup truck and cover (with the cover being positioned in the initial stage of being lifted, before rotation), and the back of a cab of a pickup truck.
Figure 3:
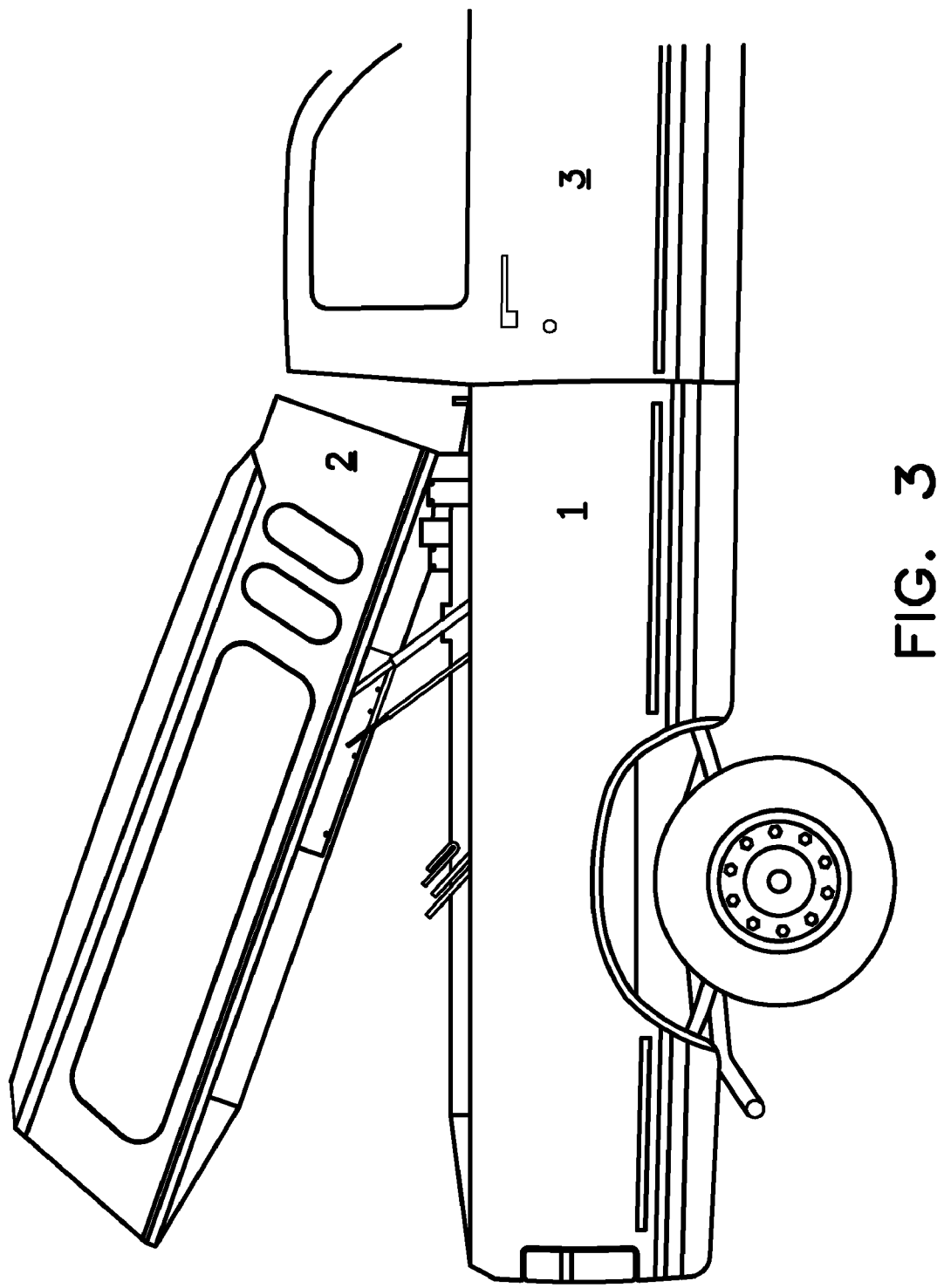
FIG. 3 is an exterior side view of a pickup truck and cover where the cover is fully lifted.

Referring to FIGS. 2, 6, 7 and 8, when opening the cover 2, the linear actuator 16 begins to extend. As the linear actuator 16 extends, the front slotted bracket 13 slides over the front pivot pin 15, and the rear pin 20 simultaneously rides upward and rearward within the rear slotted bracket slot 25. This extension causes the cover 2 to ride upward and rearward at the same time in relation to the pick up truck bed 1. FIG. 2 shows the general outside appearance during the lifting process where the front slotted bracket 13 has reached the end of upward travel over the front pivot pin 15. FIG. 7 shows the front pivot pin 15 bottomed out in the front slotted bracket 13. It is noted that at such time as the pivot pin has bottomed out within the front slotted bracket, the rear pin 20 is no longer captured within, but is resting on, the rear slotted bracket slot 25. At this instant, the cover 2 is generally on a parallel plane with the pickup truck bed 1 (see FIG. 2). As the linear actuator 16 continues to extend further, the rear pin 20 lifts off of the rear slotted bracket slot 25, and the front slotted bracket 13 starts to pivot upon the front pivot pin 15, having the effect of pivoting the rear of the cover 2 in an upward fashion relative to the pickup truck cab 3. Pivoting the front of the cover 2 has the simultaneous effect of lifting the rear of the cover 2 upward until the linear actuator 16 reaches the end of its travel. FIG. 4 shows the inside of the pickup truck bed 1 from the rear with the cover 2 being fully lifted. It is noted that the present invention minimally intrudes into the pickup truck bed 1 cargo area. The amount of rotation and the clearance between the exterior front of a cover 2 and rear of a pickup truck cab 3 is determined by a combination of the length and angle of the slot in the front slotted bracket 13, the length of the extension of the linear actuator 16, and the location of the upper and lower attachment points of the linear actuator 16 in relation to the location of front pivot pin 15. By adjusting these variables the clearance between the front of a cover 2 and the rear of the pickup truck cab 3 can be controlled along with the height that the rear of a cover 2 reaches.

When the linear actuator 16 is retracted (to close the cover 2), the cover 2 lowers by pivoting on the front pivot pin 15 thereby causing the rear pin 20 to lower/rotate and engage within the rear slotted bracket slot 25. As the rear pin 20 makes contact with the rear slotted bracket 25, the rear pin 20 aligns the cover 2 with the side rail of the pickup truck bed 1. As the rear pin 20 starts its descent within the rear slotted bracket 25 (with the linear actuators 16 continuing to retract), the front slotted bracket 13 simultaneously slides over the front pivot pin 15, having the effect of lowering the cover in a level attitude in relation to the pickup truck bed.

Figure 8:
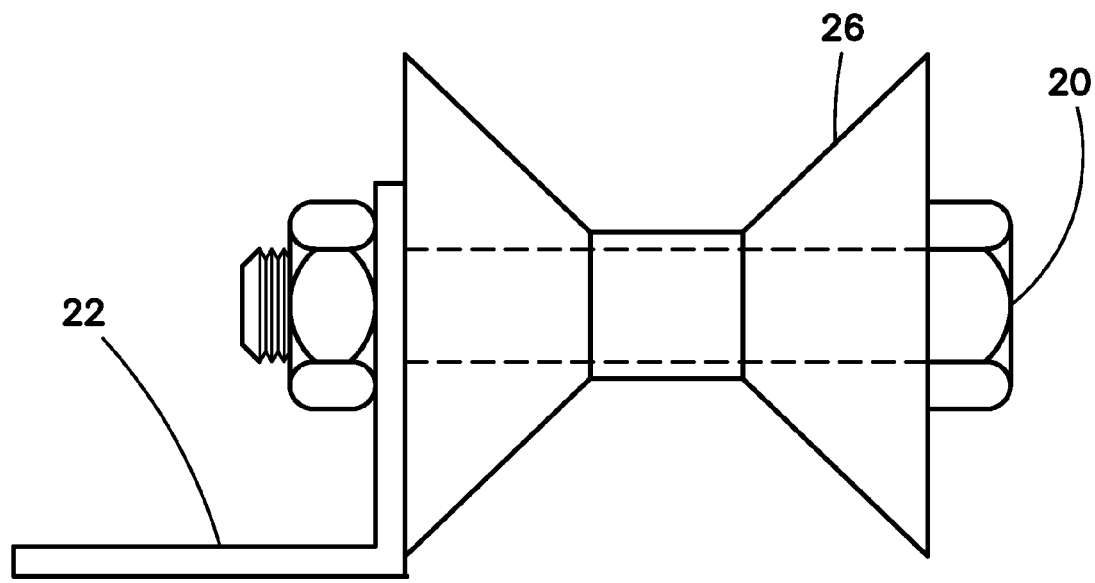
FIG. 8 is a cross sectional view of the rear pin.

As shown by FIG. 5, upon full retraction of actuator 16, the rear pin 20 has been captured by the rear slotted bracket slot 25 so that the cover 2 is secured from movement forward or upward. Also, when in the fully retracted position the linear actuator 16 provides enough resistance to restrain the front slotted bracket 13 from moving upon the front pivot pin 15 thus preventing upward, rearward or forward movement of a cover 2 (thereby denying access to the cargo area). FIG. 8 shows the tapered bushing 26 which rides upon the rear pin 20. The tapered bushing 26 has the effect of bringing the rear of the cover 2 into alignment with the pickup truck bed 1. In operation when closing the cover 2, the rear slotted bracket slot 25 comes into contact upon some portion of the tapered bushing 26. Even if the cover 2 comes into contact with the raised shoulder portion of the tapered bushing 26, given the tapered shape of the tapered bushing 26, the rear slotted bracket slot 25 will ride towards the center of the tapered bushing 26 thereby aligning the cover 2 with the truck bed 1.

The Lift and Pivot system is configured to fit on all of the current pickup truck bed 1 styles known to the inventor by virtue of the only attachment points to the pickup truck bed 1 being along the inside vertical surface of the top rail of the pickup truck bed 1, and the lowest parts of the linear actuators 16 and the lower extending arm brackets 17 being above the highest known obstruction. As seen in FIG. 4, the Lift and Pivot system also provides for a minimal intrusion of the lower edge of the front of a cover 2 into the front area of a pickup truck bed 1.

Although the rear slotted bracket 19 is shown as being positioned upon the lower support plate 21 and the rear pin 20 is shown as being positioned upon the upper support angle 22, it should be understood that these two components can be swapped with the rear slotted bracket 19 situated upon the upper support angle 22 and the rear pin 20 positioned upon the lower support plate 21.

Also, it has been shown that front slotted bracket 13 is mounted upon the upper support angle 22 and the front pivot arm 14 and the front pivot pin 15 are mounted upon the lower support plate 21. It should be understood that these components can be swapped by positioning the front slotted bracket 13 upon the lower support plate 21, with the front pivot arm 14 and the front pivot pin 15 being mounted upon the upper support angle 22.

While the invention has been illustrated and described in detail in the drawings and foregoing description, the same is to be considered as illustrative and not restrictive in character, it being understood that only a preferred embodiment has been shown and described and that all changes and modifications that come within the spirit of the invention are desired to be protected.

I claim:

1. A mechanical lift system to open and close a cargo compartment cover, comprising:
    a combination pivot and slide assembly comprised of a first and second front slide portion, with one of said front slide portions being attached to the cargo compartment cover, and the other of said front slide portions being attached to a cargo compartment;
    one of said front slide portions is defined as a front pivot pin;
    the other of said front slide portions is further defined as having a front linear slot which receives engagement from the front pivot pin thereby creating the capability of the cargo compartment cover to linearly slide, lift, and pivot within the front linear slot in relation to the cargo compartment;
    a unitary rear lifting mechanism which is further defined as having a first rear portion and a second rear portion;
    one of said rear portions is defined as a rear pin;
    the other of said rear portions is further defined as having a rear linear slot which receives engagement from the rear pin thereby providing linear lift when the cargo compartment cover is being opened, guidance when the cargo compartment cover is being opened or shut, and securement of the cargo compartment cover in relation to the cargo compartment when the cargo compartment cover is in the closed position;
    a power assist means for assisting in opening and closing the cargo compartment cover.

2. A mechanical lift system as set forth in claim 1, wherein the power assist means is further defined as a linear ram.

3. A mechanical lift system as set forth in claim 2, wherein the linear ram is defined as having a first end and a second end, wherein the first end is attached to the cargo compartment, and the second end is attached to the cargo compartment cover.

4. A mechanical lift system as set forth in claim 2, wherein the linear ram is defined as having a first end and a second end, wherein the first end is attached to the cargo compartment, and the second end is attached to the front slide portion that is attached to the cargo compartment cover.

5. A mechanical lift system as set forth in claim 1, wherein the cargo compartment is defined as a front cargo wall, a first cargo wall, and a second cargo wall;
    the cargo compartment cover is defined as a front cargo cover wall, a first cargo cover wall, and a second cargo cover wall;
    the mechanical lift system is further defined as a pair of mechanical lift systems which are rigidly mounted upon the corresponding first cargo wall and first cargo cover wall, and the corresponding second cargo wall and the second cargo cover wall, wherein said pair of mechanical lifts operate in unison.

6. A mechanical lift system to open and close a cargo compartment cover comprising:
- a cargo compartment which is comprised of a front cargo wall, a first cargo wall, and a second cargo wall;
- the cargo compartment is generally defined as having a front cargo portion and a rear cargo portion, the front cargo portion is the portion of the cargo compartment which attaches to a front cargo cover portion, the rear cargo portion is distal to the front cargo cover portion;
- the cargo compartment cover is comprised of a front cover wall, a first cover wall, and a second cover wall;
- the cargo compartment cover is further generally defined as having a front cover portion and a rear cover portion, the front cover portion is defined as the area of the cargo compartment cover where the first cover wall and the second cover wall are attached to the front cover wall, the rear cover portion is defined as the portions of the first cover wall and the second cover wall that are distal to the front cover wall;
- a combination slide lift pivot assembly, comprised of an upper lift portion and a lower lift portion;
- said upper lift portion is rigidly mounted to the first cover wall, and the lower lift portion is rigidly mounted to the first cargo wall;
- said upper lift portion is further comprised of an upper lift front member and an upper lift rear member;
- said lower lift portion is further comprised of a lower lift front member and a lower lift rear member;
- one of said upper lift front member and said lower lift front member are defined as a front linear slot;
- the other of said upper lift front member and said lower lift front member are defined as a front pivot pin;
- said front linear slot and said front pivot pin are situated in a complimentary manner whereby the front pivot pin is engaged within the front linear slot thereby swingably connecting the cargo compartment cover to the cargo compartment;
- one of said upper lift rear member and said lower lift rear member are defined as a unitary rear linear slot;
- the other of said upper lift rear member and lower lift rear member are defined as a rear pin;
- said rear linear slot and said rear pin are situated in a complimentary manner whereby the rear pin is slidably engaged within the rear linear slot thereby providing lift, alignment, and securement to the rear cover portion in relation to the rear cargo portion;
- a power assist means for assisting in opening and closing the cargo compartment cover.

7. A mechanical lift system as set forth in claim 6, wherein the power assist means is attached to one of the front slide portions.

8. A mechanical lift system as set forth in claim 6, wherein the power assist means is further defined as a linear ram.

9. A mechanical lift system as set forth in claim 8, wherein the linear ram is defined as having a first end and a second end, wherein the first end is attached to the one of said front portions, and the second end is attached to the other of said front portions.

10. A mechanical lift system as set forth in claim 6, wherein the cargo compartment is defined as a left wall and a right wall, and the cargo compartment cover is comprised of a cover left wall and a cover right wall, with the power assist means being attached to the left wall and the left cover wall, and a second power assist means being attached to the right wall and the right cover wall, wherein the power assist means and the second power assist means work in cooperation to lift and lower the cargo compartment cover.

* * * * *